(12) United States Patent
Li et al.

(10) Patent No.: US 8,039,811 B1
(45) Date of Patent: Oct. 18, 2011

(54) CMOS TIME DELAY INTEGRATION SENSOR FOR X-RAY IMAGING APPLICATIONS

(75) Inventors: Shizu Li, San Jose, CA (US); Chinlee Wang, Saratoga, CA (US)

(73) Assignee: X-Scan Imaging Corporation, San Jose, CA (US)

( * ) Notice: Subject to any disclaimer, the term of this patent is extended or adjusted under 35 U.S.C. 154(b) by 0 days.

(21) Appl. No.: 12/927,961

(22) Filed: Nov. 30, 2010

Related U.S. Application Data

(60) Provisional application No. 61/283,541, filed on Dec. 4, 2009.

(51) Int. Cl.
*G01T 1/24* (2006.01)
(52) U.S. Cl. .................................. 250/370.14
(58) Field of Classification Search ............ 250/370.01–370.15, 208.1, 214 R, 250/214 A; 378/98.8; 348/295, 308, 294, 348/302–307, 243, 241
See application file for complete search history.

(56) References Cited

U.S. PATENT DOCUMENTS

| | | | | |
|---|---|---|---|---|
| 4,529,965 A | * | 7/1985 | Lee | 341/122 |
| 5,742,047 A | * | 4/1998 | Buhler et al. | 250/214 R |
| 5,841,126 A | * | 11/1998 | Fossum et al. | 250/208.1 |
| 5,949,483 A | * | 9/1999 | Fossum et al. | 348/303 |
| 6,166,768 A | * | 12/2000 | Fossum et al. | 348/308 |
| 6,606,122 B1 | * | 8/2003 | Shaw et al. | 348/302 |
| 6,747,695 B1 | * | 6/2004 | Afghahi | 348/241 |
| 2004/0212704 A1 | * | 10/2004 | Bell et al. | 348/241 |
| 2005/0128327 A1 | * | 6/2005 | Bencuya et al. | 348/308 |
| 2009/0219427 A1 | * | 9/2009 | Kim et al. | 348/308 |
| 2010/0104071 A1 | * | 4/2010 | Nys | 378/98 |
| 2010/0134673 A1 | * | 6/2010 | Masuda | 348/308 |
| 2010/0309340 A1 | * | 12/2010 | Border et al. | 348/241 |

* cited by examiner

*Primary Examiner* — David P. Porta
*Assistant Examiner* — Kiho Kim

(57) ABSTRACT

A CMOS TDI image sensor consists of M pixels where each pixel is formed by a column of N TDI stages. Each TDI stage contains a photodiode that collects photo-charge and a pre-amplifier that proportionally converts the photo-charge to a voltage. Each TDI stage also has a set of capacitors, amplifiers, and switches for storage of the integrated signal voltages, where Correlated Double Sampling (CDS) technique (true or pseudo) maintains both photo-signal and reset voltages simultaneously. The CDS signal voltages can be passed from one TDI stage to the next TDI stage along a column for summing. The CDS signal voltages of the last TDI stages of M pixels are read out with a differential amplifier. This CMOS TDI structure is especially advantageous for implementing X-ray scanning detector systems requiring large pixel sizes and signal processing circuitry that is physically separated from the photodiode array for X-ray shielding.

24 Claims, 5 Drawing Sheets

CMOS TIME DELAY INTEGRATION SENSOR FOR X-RAY IMAGING APPLICATIONS

RELATED APPLICATIONS

This application claims benefit of Provisional Application 61283541, filed on Dec. 4, 2009, which is incorporated herein by reference.

BACKGROUND OF THE INVENTION

1. Field of the Invention

The present invention pertains generally to the field of solid-state image sensor and more particularly is a CMOS Time Delay and Integration (TDI) sensor for X-ray image scanning applications.

2. Background of the Invention

This invention is related to Time Delay and Integration (TDI) CMOS linear image sensor suitable for high-speed X-ray image scanning applications. TDI image sensors are used in high-speed line scan applications where the integrated input light signal is very low. In normal line scan application, one way to increase the integrated input light signal is to reduce the scan speed and thus increase the integration time. The TDI sensor allows the line scan detector system to increase the light signal without sacrificing the scan speed. It is normally implemented using charge transfer device, such as charge-coupled device (CCD).

In a CCD TDI array, each detector pixel contains N stages of TDI locations. For example, for an M pixels linear detector, it will contain a two dimensional M by N stages CCD array. The N stages CCD for each pixel is in parallel to the direction of scan. In operation, the first stage of CCD integrates the light signal within one integration time which equals to one line time. The signal charge will then transfer from the first stage to the second stage of CCD while the object under scan also moves from the first stage to the second stage of CCD in synchronization with the movement of the signal charge. The second stage CCD will integrate signal charge during the second integration time for the same object. As a result, at the end of the integration time the signal charge at the second stage CCD will be twice the signal charge as compared with the charge it receives from the first stage. The signal charge of the second stage will then move to the third stage in synchronization with the object movement. Again, the third stage CCD integrates light signal in addition to the signal it receives from the second stage. The process repeats and when it reaches the final N stage CCD, the light signal is multiplied by N times. An output CCD shift register then reads out the M pixels signal in sequence.

Although CCD TDI imaging system has been used extensively in visible high-speed industrial inspection applications and medical X-ray scanning applications, such as CT scan and panoramic dental scan, it does have drawbacks in industrial x-ray inspection applications. In an industrial X-ray inspection system, the detector pixel size is normally quite big as compared with normal CCD sensor pixel size. The required pixel size in such an application ranges from a few tenth of millimeters to a few millimeters. As the pixel size increases, the CCD scanning speed decreases significantly and as a result, make it unsuitable for such an application.

A second drawback for a CCD TDI system is that it is very susceptible to X-ray radiation damage. In medical X-ray scanning applications, the X-ray energy and dose used is normally much lower than that of industrial inspection applications. In medical applications, not only the X-ray dose is regulated by Federal Drug administration (FDA), the energy is normally less than 100 KeV because of soft human tissue. For industrial applications, the energy used can range from 50 KeV to 15 MeV depending on what kind of material needs to be inspected. Since there is no regulation to limit the X-ray dose in an industrial inspection system, the dose can be much higher than that of medical scanning systems. The accumulation of radiation exposure of a CCD sensor under X-ray will increase its dark current, shift its well potentials, and, as a result, reduce its usable lifetime.

The current invention is to implement a CMOS detector system that alleviates the drawbacks of CCD detector in an industrial X-ray inspection system. Since signal charges can not move from one CMOS circuit to another CMOS circuit in charge domain, it is more difficult to implement a TDI sensor using CMOS circuitry. The present invention is a method to implement TDI sensor in CMOS circuitry using charge integrating and summing amplifiers.

Accordingly, it is an object of the present invention to provide a Time Delay and Integration (TDI) image sensing structure that can be implemented using standard CMOS manufacturing processes.

Another object of the present invention is to provide a TDI image sensing detector system that is suitable for bigger pixel-to-pixel pitch, such as in an industrial X-ray detector system, without sacrificing the readout speed.

A further objective of the current invention is to provide an X-ray TDI detector system that the CMOS circuitry can be separated and away from the photodiode detectors so that the CMOS circuitry can be easily shielded from X-ray radiation damage.

SUMMARY OF THE INVENTION

Figure 1:
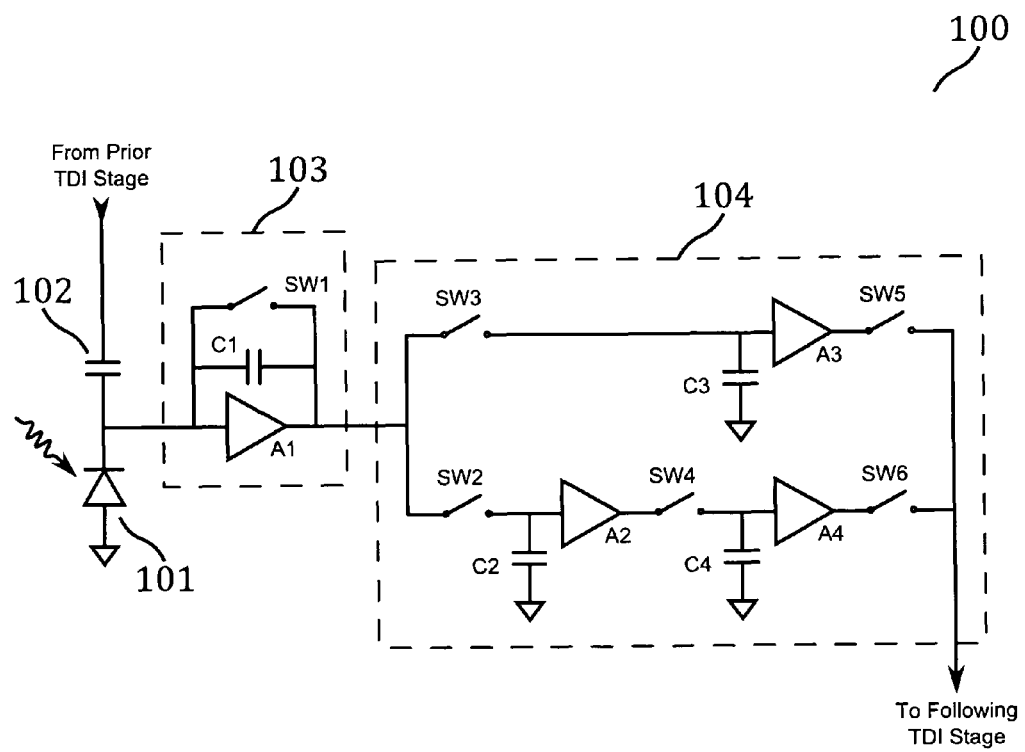
FIG. 1 shows the schematic diagram of one CMOS TDI stage of the present invention.

The advantages of the present invention of using CMOS circuitry to implement a TDI sensor are numerous. Firstly, all the peripheral circuits such as amplifiers, timing generator, and drivers can be integrated with the photodetectors using standard commercial CMOS process. Secondly, it can be implemented with large pixel size detector, such as 0.8 mm to a few millimeters pixel size. This is especially beneficial for X-ray scanning application where large pixel size is required, such as cargo container and oil pipe inspections. It is well known that CCD works better with smaller pixel size. When the pixel size gets bigger, the CCD speed slows down significantly. Therefore the CMOS TDI sensor is more suitable for industrial X-ray scanning applications. Thirdly, it is well known that CCD device and CMOS circuitry are susceptible to X-ray radiation damage. In the present CMOS implementation, the peripheral circuits can be integrated on the same chip with photodiode array but with enough separation or gap from the photodiode detectors. As a result, the peripheral circuits can be easily covered with heavy metal, such as lead, to shield from X-ray radiation damage.

The present invention uses photodiode as detector to integrate the input light signal. Each TDI stage contains a photodiode detector, a plural of amplifiers, a plural of storage capacitors, and a plural of control switches. Each photodiode is connected to an integrating amplifier, a summing circuit, and a plural of storage circuits. The integrating and summing functions can be implemented in one single amplifier or multiple amplifiers. The storage circuit is implemented using a storage capacitor and a buffer amplifier. Correlated Double Sampling (CDS) technique is used to maintain both the photo-signal and reset voltages simultaneously. The CDS photo-signal (both signal and reset) voltages can be passed to the next TDI stage for summing without accumulation of offset noise. The next TDI stage in sequence not only integrates the photo-signal during one integration time (line time), it also receives the stored CDS voltages from the prior TDI stage. A summing circuit combines both the current and the prior TDI stage CDS photo-signals and output the new CDS voltages to the storage circuits. The stored CDS voltages then pass to the next TDI stage. The process repeats until it reaches the final TDI stage where the CDS signal is read out with a differential amplifier. The readout is normally performed using a digital scanning shift register similar to a standard CMOS linear photodiode array (PDA). The operation of the TDI function, including charge integration and summation, and CDS signal storage and transfer, is controlled by a plural of control switches and a set of timing signals.

One advantage of using CMOS circuitry in implementing the TDI detector system is that it can be integrated with all the operating clock generators and signal processing circuitry on a single chip using standard CMOS process. As a result, it reduces the manufacture cost.

Another advantage of using CMOS circuitry in implementing the X-ray TDI detector system is that it can be implemented with larger pixel size and at the same time, with very high scanning speed.

Another advantage of using CMOS circuitry in the current invention in implementing the TDI detector is that the CMOS circuitry can be separated and away from photodiode array. As a result, the CMOS circuitry can be properly shielded from X-ray radiation damage.

These and other objects and advantages of the present invention will become apparent to those skilled in the art in view of the description of the best presently known mode of carrying out the invention as described herein and as illustrated in the drawings.

DETAILED DESCRIPTION OF THE PREFERRED EMBODIMENTS

Figure 2:
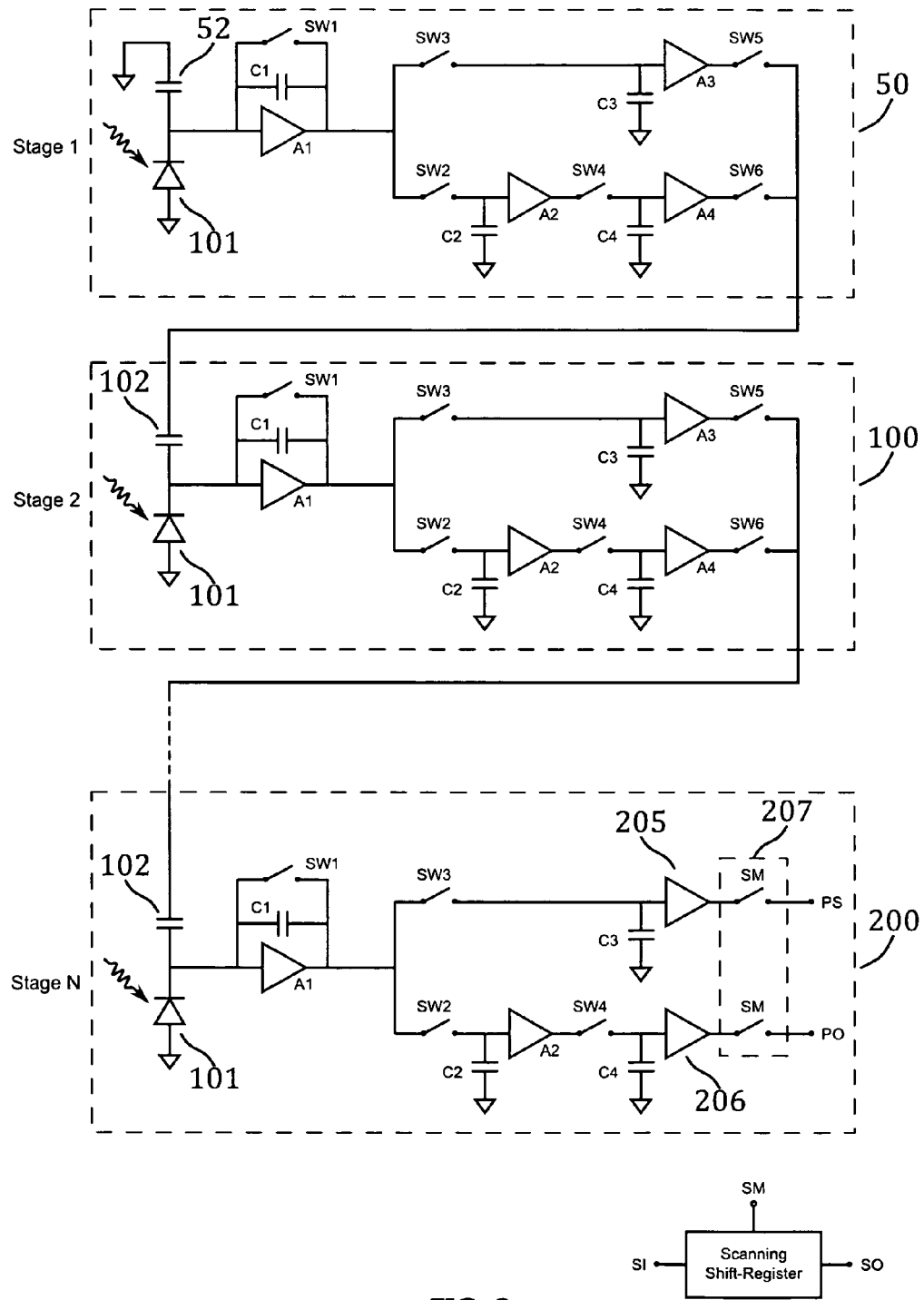
FIG. 2 shows the schematic diagram of one column of the TDI pixel with N TDI stages and a block diagram of the digital scanning shift register.
Figure 3:
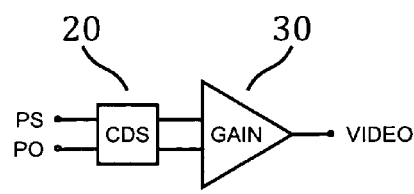
FIG. 3 shows a block diagram of the output differential amplifier to read out the video signal.
Figure 4:
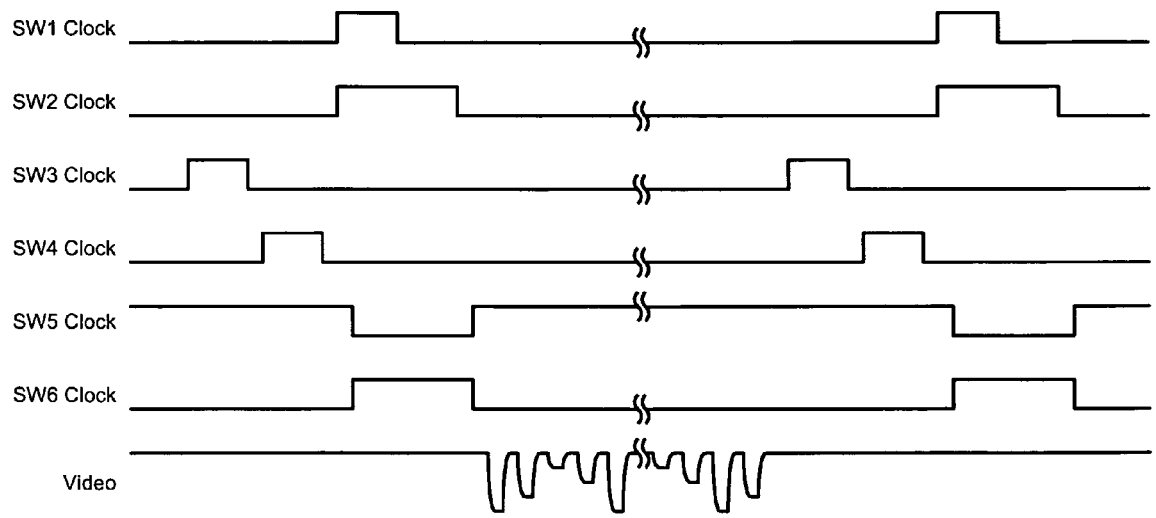
FIG. 4 shows the timing diagram to operate the TDI sensor.

FIGS. 1 to 4 depict one preferred embodiment of the present invention. FIG. 1 shows the schematic circuit diagram of one TDI stage 100. FIG. 2 shows the schematic circuit diagram of one pixel of a linear detector with N TDI stages. For an M pixel array, it will contain M columns of the circuitry as shown in FIG. 2. FIG. 3 shows a block diagram of a CDS differential amplifier at the last TDI stage to read out the signal. FIG. 4 shows the timing diagram for the operation of the TDI sensor.

As shown in FIG. 1, each TDI stage 100 consists of one photodiode 101, one summing capacitor 102, one integrating and summing amplifier 103, and one CDS circuit 104. Integrating and summing amplifier 103 comprises an amplifier A1, an integrating capacitor C1, and a reset switch SW1. Both integrating capacitor C1 and reset switch SW1 are coupled between the input and output terminals of amplifier A1. CDS circuit 104 comprises two input switches SW2 and SW3, a first storage circuit comprising capacitor C2 and buffer amplifier A2, one transfer switch SW4, a second storage circuit comprising storage capacitor C3 and buffer amplifier A3, a third storage circuit comprising storage capacitor C4 and buffer amplifier A4, and two output switches SW5 and SW6. Summing capacitor 102 is used to receive both the reset and photo-signal voltages from the prior TDI stage. Integrating and summing amplifier 103 is used to reset photodiode 101 and to integrate and sum the reset and photo-signal voltages from the prior TDI stage and its own photodiode 101. CDS circuit 104 is used to sample and hold both the combined reset and photo-signal voltages from the output of integrating and summing amplifier 103.

FIG. 2 shows a column pixel with N stages of individual TDI circuit connected in cascade. Each individual TDI stage is a replica of TDI stage 100 except the first stage 50 and last stage 200. In first TDI stage 50, since there is no prior stage, one plate of summing capacitor 52 is grounded. In last stage 200, buffer amplifiers A3 and A4 are replaced with buffer amplifiers 205 and 206 which have more driving capacity to drive heavier capacitive loading of the output differential amplifier 20 as shown in FIG. 3. To facilitate signal readout, both reset and photo signals, the output switches SW5 and SW6 of last stage 200 is replaced with a set of switches 207. Switches 207 are driven by SM which represents the output from digital scanning shift register 10. Scanning shift register 10 reads out each pixel of the M-stages array in sequence similar to a standard photodiode array. All the switches from SW1 to SW6 in each TDI stage are driven by the same clock pulses as shown in FIG. 4.

In operation, referring to FIG. 1, photodiode 101 and integrating and summing amplifier 103 are reset by closing switch SW1 before the start of its photo-signal integrating process. Simultaneously, both switches SW2 and SW6 are also closed. The close of SW6 allows the reset voltage stored on capacitor C4 to transfer to the following TDI stage. Consequently, the reset voltage of prior TDI stage is summed, through summing capacitor 102, with the reset voltage of amplifier 103. The combined reset voltage is stored on capacitor C2 through switch SW2. To begin the integration process for each TDI stage, SW1 is open followed by opening both SW2 and SW6 switches. There is a delay between the opening of SW2 and SW1 (SW1 is open earlier than SW2) as shown in the FIG. 4 timing diagram. This is to allow the settling of amplifier A1 before sampling the reset voltage into capacitor C2.

Once the integration process begins, the switch SW5 is closed to allow the photo-signal stored on capacitor C3 to transfer to the following TDI stage. Consequently, the photo-signal of prior TDI stage is summed, through summing capacitor 102, with current TDI stage photo-signal from photodetector 101. At the end of the integration cycle, switch SW3 is closed and the combined photo-signal is sampled and stored into capacitor C3. After SW3 opens, SW4 is closed and the reset voltage stored on C3 is transferred to capacitor C4. The photodiode 101 and amplifier A1 are again reset to begin the next integration cycle. The process repeats until it reaches the last TDI stage 200 as shown in FIG. 2.

Scanning shift register 10 is then initiated by a start pulse S1 to read out the signal from the M pixels linear array in sequence similar to a standard photodiode array. When a pixel is addressed by the output SM of scanning register 10, the reset and photo-signal voltages of the pixel are transferred to the CDS output differential amplifier 20 for processing. A gain stage 30 can be added to increase the signal level. As a result, a single-ended video signal is obtained as shown in FIG. 4.

Figure 5:
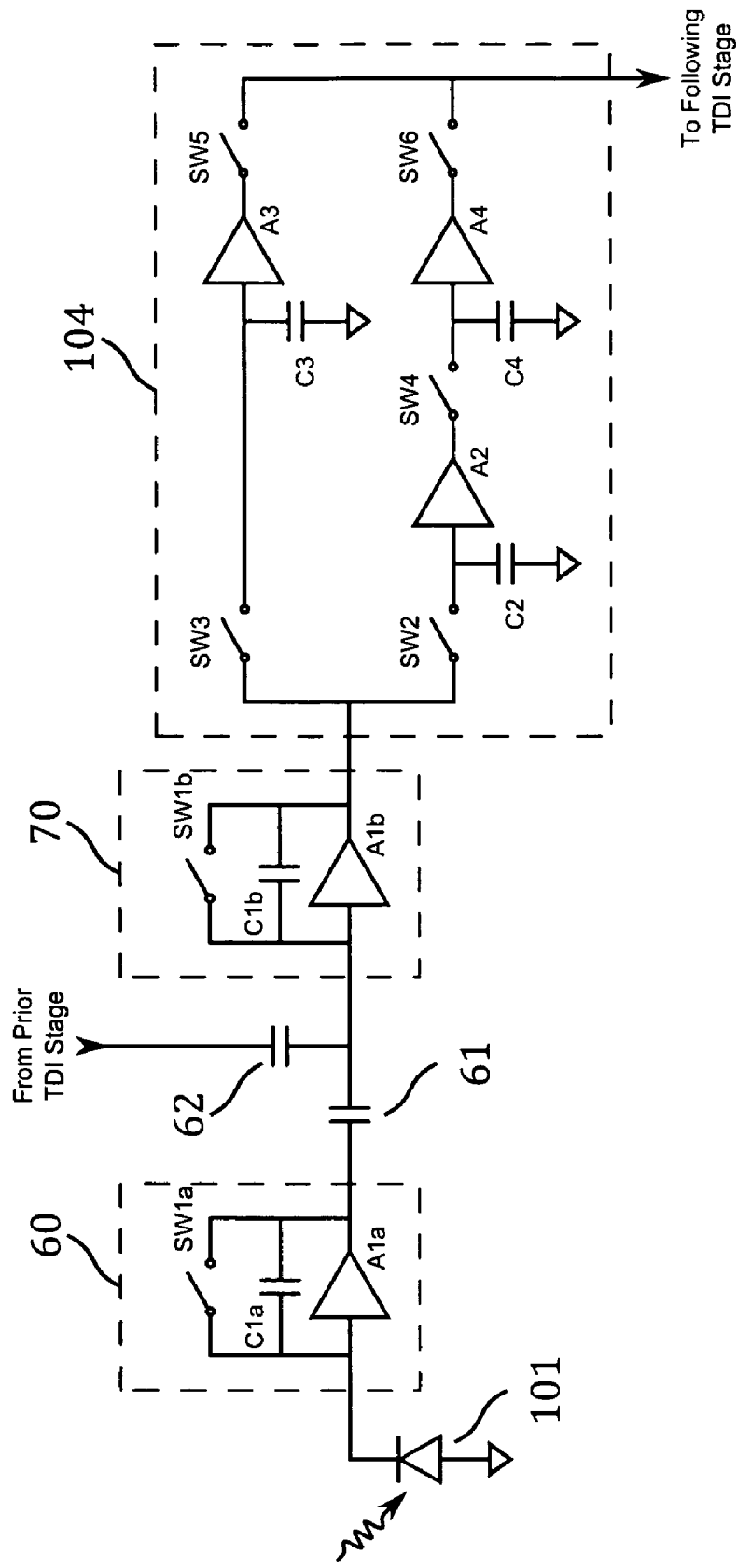
FIG. 5 shows the schematic diagram of another preferred embodiment of the present invention.

FIG. 5 shows the schematic diagram of another preferred embodiment of the present invention. It depicts one TDI stage. The only difference between the circuits in FIG. 2 and FIG. 5 is that the function of integrating and summing amplifier 103 in FIG. 2 is replaced with an integrating amplifier 60 and a summing amplifier 70 in FIG. 5. The CDS circuits in both FIG. 2 and FIG. 5 are the same. Integrating amplifier 60 comprises amplifier A1a, integrating capacitor C1a, and reset switch SW1a. The function of integrating amplifier 60 is to reset the photodiode 101 and to integrate its photo-signal into integrating capacitor C1a. Summing amplifier 70 comprises amplifier A1b, integrating capacitor C1b, and reset switch SW1b. The function of summing amplifier 70 is to sum the reset and photo voltages of photodiode 101 through summing capacitor 61 with the reset and photo voltages received from prior TDI stage through summing capacitor 62.

The CDS circuit 104 then performs the same sample-and-hold function as described before. The timing diagram in FIG. 4 will need to be modified slightly to facilitate the separation of the integrating and summing functions.

The CDS circuit 104, as shown in both FIGS. 1 & 4, uses two parallel, independent storage circuits to convey the reset signal and photo-signal. Alternatively, a chain of storage circuits can be used and where the reset signal and photo-signal can be conveyed through the chain one at a time. The advantage of using a single chain of storage circuits is that both the reset voltage and photo-signal will have the same offset induced by the buffer amplifiers. As a result, the offset can be completely eliminated by the following TDI stage.

Figure 6:
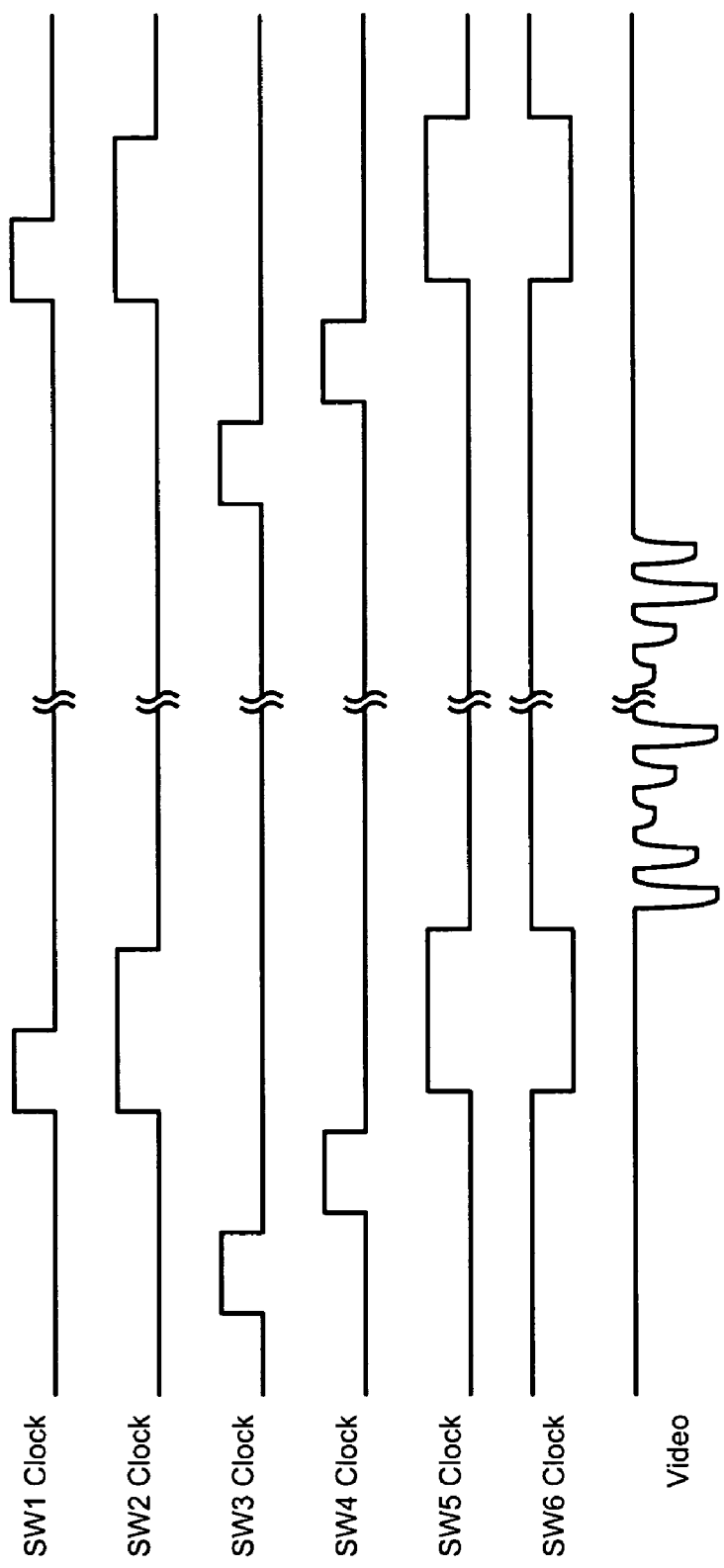
FIG. 6 shows an alternative timing to operate the TDI sensor.

In yet another preferred embodiment of the present invention, the TDI stage as shown in FIG. 1 can be operated alternatively with timing sequence as shown in FIG. 6. In this mode of operation, first the difference between the reset signal and photo-signal stored in CDS circuit 104 are taken before being summed with the photo-signal of photodiode 101. The cumulative photo-signal is then sampled and held into storage capacitor C3. The reset signal of photodiode 101 alone is also sampled and held into capacitor C2. It does not combined with the reset signal of prior TDI stage. Both modes of operation represented by timing diagrams in FIGS. 4 & 6 maintain the merit of the present invention.

Similarly the new mode of operation represented by FIG. 6 is also applicable to the TDI circuit in FIG. 5 with minor timing modification to facilitate the separation of integrating and summing functions.

The preferred embodiments described above are just examples of the present invention. There are numerous variations can be derived from this invention.

We claim:

1. A CMOS TDI detector stage comprising:
an integrating and summing amplifier having an integrating input terminal, a summing input terminal which may be joined to or may be separated from said integrating input terminal, an output terminal, an integration capacitor, and a reset switch; a photo-detector connecting to said integrating input terminal of said integrating and summing amplifier; a summing capacitor of which a first electrode is connected to output of prior TDI stage and a second electrode is connected to said summing input terminal of said integrating and summing amplifier; a correlated double sample and hold (CDS) circuit comprising a plural of switches and a plural of storage circuits, having an input terminal connected to said output terminal of said integrating and summing amplifier, and an output terminal connected to summing capacitor of the following TDI stage; and wherein said integrating and summing amplifier is first reset by closing said reset switch, and when said reset switch is subsequently open, the reset signal of said photo-detector and the reset signal stored in CDS circuit of said prior TDI stage are summed and immediately sampled and held by said CDS circuit; thereafter said integrating and summing amplifier starts integrating photo-signal of said photo-detector and simultaneously sums integrated photo-signal of said photo-detector and the photo-signal stored in said CDS circuit of said prior TDI stage into a combined photo-signal which is sampled and held by said CDS circuit; and consequently said combined photo-signal and said reset signal held in said CDS circuit are ready for transfer to said following TDI stage.

2. The CMOS TDI detector stage described in claim 1, wherein said integrating and summing amplifier comprises one or more stages.

3. The CMOS TDI detector stage described in claim 1, wherein said integrating input terminal and said summing input terminal are joined together into one input terminal, and further wherein said integration capacitor of said integrating and summing amplifier has its first electrode connected to said input terminal and its second electrode connected to said output terminal.

4. The CMOS TDI detector stage described in claim 3, wherein said integrating and summing amplifier is an analog amplifier, either with single or differential inputs.

5. The CMOS TDI detector stage described in claim 1, wherein said integrating and summing amplifier having a dual-stage amplifier with the first-stage amplifier performing the integration of said photo-signal and the second-stage performing the summing function, and furthermore the input of said first-stage amplifier becomes integrating input terminal of said integrating and summing amplifier, the input of said second-stage amplifier is connected to the output of said first-stage amplifier and becomes said summing input terminal of said integrating and summing amplifier, and output of said second-stage amplifier becomes said output terminal of said integrating and summing amplifier.

6. The CMOS TDI detector stage described in claim 5, wherein said first-stage amplifier is an analog amplifier with single or differential inputs, and furthermore said integration capacitor has its first electrode connected to said integrating input terminal and its second electrode connected to output of said first-stage amplifier.

7. The CMOS TDI detector stage described in claim 5, wherein said second-stage amplifier is an analog amplifier with single or differential inputs, and further having an additional capacitor of which its first electrode connected to said input of said second-stage amplifier and its second electrode connected to said output of said second-stage amplifier.

8. The CMOS TDI detector stage described in claim 1, wherein said photo-detector having a photo-sensitive diode capable of converting light into electrical current.

9. The CMOS TDI detector stage described in claim 1, wherein said storage circuit of said CDS circuit having a storage capacitor and a buffer amplifier.

10. The CMOS TDI detector stage described in claim 1, wherein said combined reset signal and said combined photo-signal are conveyed in parallel, independent storage circuits in said CDS circuit.

11. The CMOS TDI detector stage described in claim 1, wherein said combined reset signal and said combined photo-signal are both conveyed in a single chain of storage circuits;

furthermore said combined reset signal and said combined photo-signal are conveyed one-at-a-time through each storage circuit.

12. The CMOS TDI detector stage described in claim 1, wherein said photo-detector, said integrating and summing amplifier, and said CDS circuit are integrated on a single substrate, and further wherein a plurality of integrating and summing amplifiers and CDS circuits are physically isolated from a plurality of photo-detectors, so that the said plurality of integrating and summing amplifiers and CDS circuits may be shielded from harmful radiation while a plurality of photo-detectors is exposed to some harmful radiation in the process of receiving light.

13. A CMOS TDI detector stage comprising:
an integrating and summing amplifier having an integrating input terminal, a summing input terminal which may be joined to or may be separated from said integrating input terminal, an output terminal, an integration capacitor, and a reset switch; a photo-detector connecting to said integrating input terminal of said integrating and summing amplifier;
a summing capacitor of which a first electrode is connected to output of prior TDI stage and a second electrode is connected to said summing input terminal of said integrating and summing amplifier; a correlated double sample and hold (CDS) circuit comprising a plural of switches and a plural of storage circuits, having an input terminal connected to said output terminal of said integrating and summing amplifier, and an output terminal connected to summing capacitor of the following TDI stage; and wherein said integrating and summing amplifier is first reset by closing said reset switch, and when said reset switch is subsequently open, the resulting reset signal is sampled and held by said CDS circuit; thereafter said integrating and summing amplifier starts integrating photo-signal of said photo-detector and generates a cumulative signal that is the summation of integrated photo-signal of said photo-detector and the difference between the prior cumulative signal held in CDS circuit of said prior TDI stage and the reset signal held in said CDS circuit of said prior TDI stage; furthermore said cumulative signal is sampled and held by said CDS circuit; and consequently said cumulative signal and said reset signal held in said CDS circuit are ready for transfer to said following TDI stage.

14. The CMOS TDI detector stage described in claim 13, wherein said integrating and summing amplifier comprises one or more stages.

15. The CMOS TDI detector stage described in claim 13, wherein said integrating input terminal and said summing input terminal are joined together into one input terminal, and further wherein said integration capacitor of said integrating and summing amplifier has its first electrode connected to said input terminal and its second electrode connected to said output terminal.

16. The CMOS TDI detector stage described in claim 15, wherein said integrating and summing amplifier is an analog amplifier, either with single or differential inputs.

17. The CMOS TDI detector stage described in claim 13, wherein said integrating and summing amplifier having a dual-stage amplifier with the first-stage amplifier performing the integration of said photo-signal and the second-stage performing the summing function, and furthermore the input of said first-stage amplifier becomes integrating input terminal of said integrating and summing amplifier, the input of said second-stage amplifier is connected to the output of said first-stage amplifier and becomes said summing input terminal of said integrating and summing amplifier, and output of said second-stage amplifier becomes said output terminal of said integrating and summing amplifier.

18. The CMOS TDI detector stage described in claim 17, wherein said first-stage amplifier is an analog amplifier with single or differential inputs, and furthermore said integration capacitor has its first electrode connected to said integrating input terminal and its second electrode connected to output of said first-stage amplifier.

19. The CMOS TDI detector stage described in claim 17, wherein said second-stage amplifier is an analog amplifier with single or differential inputs, and further having an additional capacitor of which its first electrode connected to said input of said second-stage amplifier and its second electrode connected to said output of said second-stage amplifier.

20. The CMOS TDI detector stage described in claim 13, wherein said photo-detector having a photo-sensitive diode capable of converting light into electrical current.

21. The CMOS TDI detector stage described in claim 13, wherein said storage circuit of said CDS circuit having a storage capacitor and a buffer amplifier.

22. The CMOS TDI detector stage described in claim 13, wherein said reset signal and said cumulative signal are conveyed in parallel, independent storage circuits in said CDS circuit.

23. The CMOS TDI detector stage described in claim 13, wherein said reset signal and said cumulative signal are both conveyed in a single chain of storage circuits; furthermore said reset signal and said cumulative signal are conveyed one-at-a-time through each storage circuit.

24. The CMOS TDI detector stage described in claim 13, wherein said photo-detector, said integrating and summing amplifier, and said CDS circuit are integrated on a single substrate, and further wherein a plurality of integrating and summing amplifiers and CDS circuits are physically isolated from a plurality of photo-detectors, so that said plurality of integrating and summing amplifiers and CDS circuits may be shielded from harmful radiation while a plurality of photo-detectors is exposed to some harmful radiation in the process of receiving light.

\* \* \* \* \*